US006348554B1

(12) United States Patent
Roos et al.

(10) Patent No.: US 6,348,554 B1
(45) Date of Patent: Feb. 19, 2002

(54) METHOD FOR PREPARATION OF A LIQUID POLYMER COMPOSITION AND USE OF THIS COMPOSITION

(75) Inventors: Sebastian Roos, Mainz; Boris Eisenberg, Darmstadt; Michael Mueller, Bensheim, all of (DE)

(73) Assignee: RohMax Additives GmbH, Darmstadt (DE)

( * ) Notice: Subject to any disclaimer, the term of this patent is extended or adjusted under 35 U.S.C. 154(b) by 0 days.

(21) Appl. No.: 09/450,741

(22) Filed: Nov. 30, 1999

(51) Int. Cl.$^7$ ................ C08J 4/10; C08J 8/00
(52) U.S. Cl. ............ 526/319; 526/92; 526/95; 526/124.8; 526/335; 526/344; 525/192; 525/217; 525/221; 525/222
(58) Field of Search ............... 525/208, 221, 525/192, 217, 335, 344; 526/319, 92, 95, 124.8, 328, 344, 335

(56) References Cited

U.S. PATENT DOCUMENTS

| 5,807,937 A | 9/1998 | Matyjaszewski et al. |
| 5,854,364 A | 12/1998 | Senninger et al. |
| 6,191,225 B1 * | 2/2001 | Barkac et al. ............. 525/208 |

FOREIGN PATENT DOCUMENTS

| EP | 0 570 093 A1 | 11/1993 |
| EP | 0 682 046 A1 | 11/1995 |
| WO | WO 97/47661 | 12/1997 |
| WO | WO-9840415 | * 9/1998 |

OTHER PUBLICATIONS

Jin–Shan Wang, et al., Macromolecules, vol. 28, No. 23, pp. 7901–7910, "Controlled/"Living" Radical Polymerization. Halogen Atom Transfer Radical Polymerization Promoted by a Cu(I)/Cu(II) Redox Process", 1995.

* cited by examiner

Primary Examiner—David W. Wu
Assistant Examiner—Tanya Zalukawa
(74) Attorney, Agent, or Firm—Oblon, Spivak, McClelland, Maier & Neustadt, P.C.

(57) ABSTRACT

The invention concerns a method for preparation of a liquid polymer composition, where ethylenically unsaturated monomers are polymerized by means of initiators that have a transferable atomic group, and one or more catalysts that contain at least one transition metal, in the presence of ligands that can form a coordination compound with the metallic catalysts, the catalyst is oxidized after the polymerization and then the catalyst is separated by filtration, where the composition contains a solvent with a dielectric constant less than or equal to 4.

16 Claims, No Drawings

METHOD FOR PREPARATION OF A LIQUID POLYMER COMPOSITION AND USE OF THIS COMPOSITION

The invention concern a method for preparation of a liquid polymer composition, where ethylenically unsaturated monomers are polymerized by means of initiators that have a transferable atomic group, and one or more catalysts that contain at least one transition metal, in the presence of ligands that can form a coordination compound with the metallic catalyst(s). The invention also concerns the use of these polymer compositions and a method for isolation of polymers from such a polymer solution.

Radical polymerization is an important commercial method for producing a large number of polymers such as PMMA and polystyrene. It is disadvantageous here that it is relatively difficult to control the constitution of the polymers, the molecular weight and the molecular weight distribution.

One solution to this problem is offered by the so called ATRP method (Atom Transfer Radical Polymerization). It is assumed that here one is dealing with a "living" radical polymerization without any limitation being intended by the description of the mechanism. In these methods a transition metal compound is reacted with a compound that has a transferable atomic group. Here the transferable atomic group is transferred to the transition metal compounds, whereby the metal becomes oxidized. A radical that adds to ethylenic groups is formed in this reaction. However, the transfer of the atomic group to the transition metal compound is reversible, so that the atomic group is transferred back to the growing polymer chain, through which a controlled polymerization system is formed. Accordingly, the constitution of the polymer, the molecular weight and molecular weight distribution can be controlled.

This reaction method is described, for example, by J-S. Wang, et al., J. Am. Chem. Soc., Vol. 117, pp. 5614–5615 (1995), by Matyjaszewski, Macromolecules, Vol. 28, pp. 7901–7910 (1995). Moreover, the patent applications WO 96/30421, WO 97/47661, WO 97/18247, WO 98/40415 and WO 99/10387 disclose variations of the ATRP, explained above.

The mechanism described above is not undisputed. For example, it is described in WO 97/47661 that the polymerization takes place not by a radical mechanism but rather by insertion. However, for the present invention this differentiation is immaterial, since with the reaction methods disclosed in WO 97/47661 compounds are used that are also used in an ATRP.

A disadvantage with the known ATRP polymerization method is the fact that the transition metal catalysts that are used have to be separated from the polymers, since the transition metals discolor the polymers and molded articles that may be made from them. On top of that, the metals can have undesirable effects, in each case according to the use of the polymers. Up to now the polymers had been precipitated from the solution by the addition of suitable compounds such as methanol, and then separated from the metal-containing solution by filtration or centrifuging. Moreover, the transition metal can be separated by chromatographic methods. These methods, however, are hardly suitable for large scale use, since they are time consuming and expensive.

Taking into account the prior art, it is now the task of this invention to make available a method for preparation of liquid polymer compositions that are essentially free of transition metal compounds, where the polymers contained in the composition are supposed to have a narrow molecular weight distribution. In particular, the use of expensive methods like chromatographic methods are supposed to be avoided in the separation of the transition metal compounds.

Another task was to specify a method that can be carried out at reasonable cost and can be used on an industrial scale. Moreover, the method should be able to be carried out with commercially available components in an easy and simple manner.

These tasks, as well as other tasks that are not explicitly mentioned but which can easily be derived or developed from the introductory material, are solved by a method for preparation of a liquid polymer composition with all of the characteristics of claim 1. Protection is provided for suitable modifications of the method in accordance with the invention in the subclaims that relate back to claim 1. With regard to the method for preparation of polymers, claim 13 provides a solution of the underlying task, while claim 14 protects a preferred use of a polymer solution prepared in accordance with the present method.

Because the transition metal of the catalyst is oxidized after the polymerization and the catalyst is then separated by filtration, where the composition contains a solvent with a dielectric constant $\leq 4$, it is possible to make available a not readily foreseeable method for preparation of a liquid polymer composition that is essentially free of transition metal compounds, where ethylenically unsaturated monomers are polymerized by means of initiators that exhibit transferable atomic groups, and one or more catalysts that include at least one transition metal, in the presence of ligands that can form a coordination compound with the metallic catalyst. This manner of preparation can be carried out at especially reasonable costs.

The fact that the catalysts can be separated by a traditional filtration method if the composition has a solvent with a dielectric constant $\leq 4$ is particularly surprising since many of the compositions used for ATRP are heterogeneous systems. If these reaction mixtures are filtered, one finds that a considerable part of the transition metal catalyst does not remain behind on the filter, since the particle size of the catalyst is too small. An essentially complete separation from the composition is not possible. Here one should in particular bear in mind that the resulting polymers elevate the viscosity of the composition, so that the pore size of the filter cannot be chosen to be as small as one wishes.

At the same time a number of additional advantages can be achieved through the method in accordance with the invention. Among these are:

A narrow distribution of the polymers in the polymer composition prepared by the method.

The method in accordance with the invention enables excellent control of the molecular weight of the polymers contained in the compositions.

The conduct of the polymerization is relatively unproblematic with respect to pressure, temperature and solvent, and results that are acceptable under certain circumstances are achieved even at moderate temperatures.

The method in accordance with the invention is low in side reactions.

The method can be carried out at reasonable costs.

Polymers with a predefined constitution and targeted structure can be produced by means of the method of this invention.

Any radically polymerizable monomer can serve as a monomer in this invention. However, particularly suitable as monomers for polymerization in accordance with this invention are monomers that correspond to the formula:

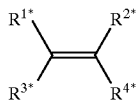

where $R^{1*}$ and $R^{2*}$ are independently selected from the group consisting of hydrogen, halogens, CN, linear or branched alkyl groups with 1 to 20, preferably 1 to 6 and especially preferably 1 to 4 carbon atoms, which can be substituted with 1 to (2n+1) halogen atoms, where n is the number of carbon atoms of the alkyl group (for example $CF_3$), α, β-unsaturated linear or branched alkenyl or alkynyl groups with 2 to 10, preferably 2 to 6 and especially preferably 2 to 4 carbon atoms, which can be substituted with 1 to (2n-1) halogen atoms, preferably chlorine, where n is the number of carbon atoms of the alkyl group, for example $CH_2=CCl—$, cycloalkyl groups with 3 to 8 carbon atoms, which can be substituted with 1 to (2n-1) halogen atoms, preferably chlorine, where n is the number of carbon atoms of the cycloalkyl group; $C(=Y^*)R^{5*}$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}{}_2$, $P(=Y^*)R^{5*}{}_2$, $Y^*PR^{5*}{}_2$, $Y^*P(=Y^*)R^{5*}{}_2$, $NR^{8*}{}_2$, which can be quaternized with an additional $R^{8*}$, aryl, or heterocyclyl group, where $Y^*$ can be $NR^{8*}$, S or O, preferably O; $R^{5*}$ is an alkyl group with 1 to 20 carbon atoms, an alkylthio group with 1 to 20 carbon atoms, $OR^{15}$ ($R^{15}$ is hydrogen or an alkali metal), alkoxy with 1 to 20 carbon atoms, aryloxy or heterocyclyloxy; $R^{6*}$ and $R^{7*}$ independently are hydrogen or an alkyl group with one to 20 carbon atoms, or $R^{6*}$ and $R^{7*}$ together can form an alkylene group with 2 to 7, preferably 2 to 5 carbon atoms, where they form a 3 to 8 member, preferably 3 to 6 member ring, and $R^{8*}$ is linear or branched alkyl or aryl groups with 1 to 20 carbon atoms; $R^{3*}$ and $R^{4*}$ independently are chosen from the group consisting of hydrogen, halogen (preferably fluorine or chlorine), alkyl groups with 1 to 6 carbon atoms and $COOR^{9*}$, where $R^{9*}$ is hydrogen, an alkali metal or an alkyl group with 1 to 40 carbon atoms, or $R^{1*}$ and $R^{3*}$ can together form a group of the formula $(CH_2)_{n'}$, which can be substituted with 1 to 2n' halogen atoms or $C_1$ to $C_4$ alkyl groups, or can form a group of the formula $C(=O)—Y^*—C(=O)$, where n' is from 2 to 6, preferably 3 or 4, and $Y^*$ is defined as before; and where at least 2 of the residues $R^{1*}$, $R^{2*}$, $R^{3*}$ and $R^{4*}$ are hydrogen or halogen.

Among these monomers, among others are vinyl halides such as vinyl chloride, vinyl fluoride, vinylidene chloride and vinylidene fluoride; vinyl esters like vinyl acetate; styrene, substituted styrenes with an alkyl substituent in the side chain such as α-methylstyrene and α-ethylstyrene, substituted styrenes with an alkyl substituent in the ring such as vinyltoluene and p-methylstyrene, halogenated styrenes such as monochlorostyrenes, dichlorostyrenes, tribromostyrenes and tetrabromostyrenes; heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives such as maleic anhydride, methylmaleic anhydride, maleinimide, methylmaleinimide; dienes such as divinylbenzene; and (meth)acrylates.

Preferred monomers are (meth)acrylates. The term (meth)acrylates comprises methacrylates and acrylates as well as mixtures of the two. These monomers are to a large extent already known. Among these are (meth)acrylates that derive from saturated alcohols such as methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate, and/or eicosyltetratriacontyl (meth)acrylate; (meth)acrylates that derive from unsaturated alcohols such as oleyl (meth)acrylate, 2-propynyl (meth)acrylate, allyl (meth)acrylate, vinyl (meth)acrylate, etc.; amides and nitriles of (meth)acrylic acid like N-(3-dimethylaminopropyl)(meth)acrylamide, N-(diethylphosphono)(meth)acrylamide, 1-methacryloylamido-2-methyl-2-propanol, N-(3-butylaminopropyl)(meth)acrylamide, N-t-butyl-N-(diethylphosphono)(meth)acrylamide, N,N-bis(2-diethylaminoethyl)(meth)acrylamide, 4-methacryloylamido-4-methyl-2-pentanol, methacryloylamidoacetonitrile, N-(methoxymethyl)(meth)acrylamide, N-(2-hydroxyethyl)(meth)acrylamide, N-(dimethylaminoethyl)(meth)acrylamide, N-methyl-H-phenyl(meth)acrylamide, N,N-diethyl (meth)acrylamide, N-acetyl(meth)acrylamide, N-methyl(meth)acrylamide, N,N-dimethyl(meth)acrylamide, N-isopropyl(meth)acrylamide;

aminoalkyl (meth)acrylates like
  tris(2-(meth)acryloxyethyl)amine,
    N-methylformamidoethyl (meth)acrylate,
    3-diethylaminopropyl (meth)acrylate,
    4-dipropylaminobutyl (meth)acrylate, 2-ureidoethyl (meth)acrylate;

other nitrogen-containing (meth)acrylates like
  N-((meth)acryloyloxyethyl)diisobutylketimine, 2-(meth)acryloyloxyethylmethylcyanamide, cyanomethyl (meth)acrylate;
  aryl (meth)acrylates like benzyl (meth)acrylate or phenyl (meth)acrylate, where the aryl residues in each case can be unsubstituted or substituted up to four times;
  carbonyl-containing (meth)acrylates like
  2-carboxyethyl (meth)acrylate, N-(2-methacryloyloxyethyl)-2-pyrrolidinone, N-(3-methacryloyloxypropyl)-2-pyrrolidinone, carboxymethyl (meth)acrylate, N-methacryloylmorpholine, oxazolidinylethyl (meth)acrylate, N-(methacryloyloxy) formamide, acetonyl (meth)acrylate, N-methacryloyl-2-pyrrolidinone;

cycloalkyl (meth)acrylates like
  3-vinylcyclohexyl (meth)acrylate, bornyl (meth)acrylate, hydroxyalkyl (meth)acrylate, 3-hydroxypropyl (meth)acrylate, 3,4-dihydroxybutyl (meth)acrylate, 2-hydroxyethyl (meth)acrylate, 2-hydroxypropyl (meth)acrylate;

glycol di(meth)acrylates like 1,4-butanediol (meth) acrylate, methacrylates of ether alcohols like tetrahydrofurfuryl (meth)acrylate, vinyloxyethoxyethyl (meth)acrylate, methoxyethoxyethyl (meth)acrylate, 1-butoxypropyl (meth)acrylate, 1-methyl-(2-vinyloxy) ethyl (meth)acrylate, cyclohexyloxymethyl (meth) acrylate, methoxymethoxyethyl (meth)acrylate, benzyloxymethyl (meth)acrylate, furfuryl (meth)acrylate, 2-butoxyethyl (meth)acrylate, 2-ethoxyethoxymethyl (meth)acrylate, 2-ethoxyethyl (meth)acrylate, allyloxymethyl (meth)acrylate, 1-ethoxybutyl (meth) acrylate, methoxymethyl (meth)acrylate, 1-ethoxyethyl (meth)acrylate, ethoxymethyl (meth)acrylate;

methacrylates of halogenated alcohols like 2,3-dibromopropyl (meth)acrylate, 4-bromophenyl (meth)acrylate, 1,3-dichloro-2-propyl (meth)acrylate, 2-bromoethyl (meth)acrylate, 2-iodoethyl (meth) acrylate, chloromethyl (meth)acrylate;

oxiranyl (meth)acrylates like 10,11-epoxyundecyl (meth)acrylate, 2,3-epoxycyclohexyl (meth)acrylate, 2,3-epoxybutyl (meth)acrylate, 3,4-epoxybutyl (meth)acrylate, glycidyl (meth)acrylate;

phosphorus-, boron- and/or silicon-containing methacrylates like 2-(dibutylphosphono)ethyl (meth)acrylate, 2,3-butylene (meth)acryloylethylborate, 2-(dimethylphospato) propyl (meth)acrylate, methyldiethoxy (meth) acryloylethoxysilane, 2-(ethylenephosphito)propyl (meth)acrylate, dimethylphosphinomethyl (meth) acrylate, dimethylphosphonoethyl (meth)acrylate, diethyl (meth)acryloylphosphonate, diethylphosphatoethyl (meth)acrylate, dipropyl (meth) acryloylphosphate;

sulfur-containing methacrylates like ethylsulfinylethyl (meth)acrylate, 4-thiocyanatobutyl (meth)acrylate, ethylsulfonylethyl (meth)acrylate, thiocyanatomethyl (meth)acrylate, methylsulfinylmethyl (meth)acrylate, bis((meth)acryloyloxyethyl) sulfide;

tri(meth)acrylates like trimethyloylpropane tri(meth)acrylate;

heterocyclic (meth)acrylates like 2-(1-imidazolyl)ethyl (meth)acrylate, 2-(4-morpholinyl) ethyl (meth)acrylate and 1-(2-methacryloyloxyethyl)-2-pyrrolidone.

Meth(acrylates) that derive from saturated alcohols with 1 to 40 C atoms, preferably 6 to 24 C atoms, where the alcohol residue can be linear or branched, are especially preferred.

The ester compounds with a long-chain alcohol residue can be obtained, by example, by reacting (meth)acrylates, fumarates, maleates and/or the corresponding acids with long-chain fatty alcohols, where in general a mixture of esters, for example (meth)acrylates with different long-chain alcohol residues, results. Among these fatty alcohols are Oxo Alcohol® 7911 and Oxo Alcohol® 7900, Oxo Alcohol® 1100 (Monsanto); Alphanol® 79 (ICI); Nafol® 1620, Alfol® 610 and Alfol® 810 (Condea); Epal® 610 and Epal® 810 (Ethyl Corporation); Linevol® 79, Linevol® 911 and Dobanol® 25L (Shell AG); Lial 125 (Augusta® Mailand); Dehydad® and Lorol® (Henkel KGaA) and Linopol® 7–11 and Acropol® 91 (Ugine Kuhlmann).

The previously mentioned ethylenically unsaturated monomers can be used individually or as mixtures. In preferred embodiments of the method in accordance with the invention at least 50% by weight of the monomers, preferably at least 60% by weight of the monomer, especially preferably more than 80% by weight of the monomers, with respect to the total weight of the ethylenically unsaturated monomers, are (meth)acrylates. In addition, it is possible to vary the monomer composition during the polymerization in order to obtain specific structures such as block copolymers.

Moreover, monomer compositions that contain at least 60% by weight, especially preferably more than 80% by weight (meth)acrylates with alkyl or heteroalkyl chains that have at least 6 carbon atoms with respect to the total weight of the ethylenically unsaturated monomers are preferred.

Besides the (meth)acrylates, maleates and fumarates that likewise have long-chain alcohol residues are preferred.

Thus, for example, a really especially preferred monomer composition encompasses the following ethylenically unsaturated monomers:

a) 60 to 100% by weight, especially 80 to 100% by weight, of one or more (meth)acrylates of formula (I)

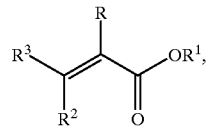

(I)

where R means gen or methyl, $R^1$ means a linear or branched alkyl residue with 6 to 40 carbon atoms, preferably 6 to 24 carbon atoms, $R^2$ and $R^3$ independently means hydrogen or a group of the formula —COOR', where R' is hydrogen or a linear or branched alkyl residue with 6 to 40 carbon atoms, b) 0 to 40% by weight, especially 0.5 to 20% by weight, of one or more (meth)acrylates of formula (II)

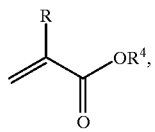

(II)

where R means hydrogen or methyl and $R^4$ means a linear or branched alkyl residue with 1 to 5 carbon atoms, c) 0 to 40% by weight, especially 0.5 to 20% by weight, of one or more (meth)acrylates of formula (III)

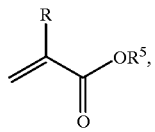

(III)

where R means hydrogen or methyl and $R^5$ means an alkyl residue with 2 to 20, especially 2 to 6 carbon atoms, substituted by an OH group, or an alkoxylated residue of formula (IV)

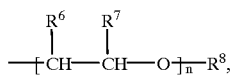

(IV)

where $R^6$ and $R^7$ independently stand for hydrogen or methyl, $R^8$ means hydrogen or an alkyl residue with 1 to 40 carbon atoms and n is a whole number from 1 to 60, d) 0 to 40% by weight, especially 0.5 to 20% by weight of one or more (meth)acrylates of formula (V)

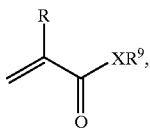

(V)

where R means hydrogen or methyl, X means oxygen or an amino group of the formula —NH— or —NR$^{10}$—, where R$^{10}$ stands for an alkyl residue with 1 to 40 carbon atoms and R$^9$ means a linear or branched alkyl residue with 2 to 20, preferably 2 to 6 carbon atoms that is substituted with at least one —NR$^{11}$R$^{12}$— group, where R$^{11}$ and R$^{12}$ independently stand for hydrogen, an alkyl residue with 1 to 20, preferably 1 to 6 [carbon atoms] or where R$^{11}$ and R$^{12}$ together with the nitrogen atom and optionally another nitrogen or oxygen atom form a 5 or 6 member ring, which can optionally be substituted with C$_1$–C$_6$ alkyl, and e) 0 to 40% by weight, especially 0.5 to 20% by weight, of one or more comonomers, where the specification of % by weight in each case refers to the total weight of the ethylenically unsaturated monomers.

Examples of these monomers were given above.

Comonomers are ethylenically unsaturated monomers that can be copolymerized with the (meth)acrylates of formula I, II, III and/or V. Besides styrene, monomers that are particularly preferred as comonomers are ones that have dispersing activity such as the previously mentioned heterocyclic vinyl compounds.

The previously mentioned monomers are polymerized by means of initiators that have a transferable atomic group. In general, these initiators can be described by the formula Y—(X)$_m$, where Y represents the core molecule, of which it is assumed that it forms radicals, X represents a transferable atom or a transferable atomic group and m is a whole number in the range of 1 to 10, depending on the functionality of group Y. If m>1, the various transferable atomic groups X can have differing importance. If the functionality of the initiator is >2, star polymers are obtained. Preferred transferable atoms or atomic groups are halogens such as Cl, Br and/or I.

As previously mentioned, it is assumed that group Y forms radicals, which serve as the starting molecule, where this radical adds to the ethylenically unsaturated monomers. For this reason group Y preferably has substituents that can stabilize radicals. Among these substituents are —CN, —COR and —CO$_2$R, where in each case R is an alkyl or aryl residue or aryl and/or heteroaryl group.

Alkyl residues are saturated or unsaturated, branched or linear hydrocarbon residues with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl residues are cyclic aromatic residues that have 6 to 14 carbon atoms in the aromatic ring. These residues can be substituted. Substituents are, for example, linear and branched alkyl groups with 1 to 6 carbon atoms such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups and halides.

Among the aromatic residues are, for example, phenyl, xylyl, toluyl, naphthyl or biphenyl.

The term "heteroaryl" identifies a heteroaromatic ring system, where at least one CH group is replaced by N or two neighboring CH groups by S, O or NH, such as a residue of thiophene, furan, pyrrole, thiazole, oxazole, pyridine, pyrimidine and benzo[a]furan, which likewise can have the previously mentioned substituents.

An initiator that can be used in accordance with the invention can be any compound that has one or more atoms or atomic groups that are radically transferable under the polymerization conditions.

Suitable initiators include those of the formulas:

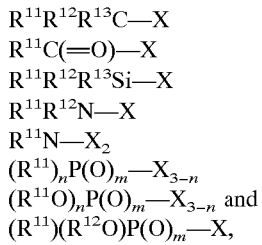

R$^{11}$R$^{12}$R$^{13}$C—X
R$^{11}$C(=O)—X
R$^{11}$R$^{12}$R$^{13}$Si—X
R$^{11}$R$^{12}$N—X
R$^{11}$N—X$_2$
(R$^{11}$)$_n$P(O)$_m$—X$_{3-n}$
(R$^{11}$O)$_n$P(O)$_m$—X$_{3-n}$ and
(R$^{11}$)(R$^{12}$O)P(O)$_m$—X, where X is selected from the group consisting of Cl, Br, I, OR$^{10}$, [where R$^{10}$ is an alkyl group with 1 to 20 carbon atoms, where each hydrogen atom can independently be replaced by a halide, preferably chloride or fluoride, an alkenyl with 2 to 20 carbon atoms, preferably vinyl, an alkynyl with 2 to 10 carbon atoms, preferably acetylenyl or phenyl, which can be substituted with 1 to 5 halogen atoms or alkyl groups with 1 to 4 carbon atoms, or aralkyl (aryl-substituted alkyl in which the aryl group is phenyl or substituted phenyl and the alkyl group is an alkyl with 1 to 6 carbon atoms, such as benzyl, for example)], SR$^{14}$, SeR$^{14}$, OC(=O)R$^{14}$, OP(=O)R$^{14}$, OP(=O) (OR$^{14}$)$_2$, OP(=O) OR$^{14}$, O—N(R$^{14}$)$_2$, S—C(=S)N(R$^{14}$)$_2$, CN, NC, SCN, CNS, OCN, CNO and N$_3$, where R$^{14}$ means an alkyl group or a linear or branched alkyl group with 1 to 20, preferably 1 to 10 carbon atoms, where two R$^{14}$ groups, if present, together can form a 5, 6 or 7-member heterocyclic ring; and R$^{11}$, R$^{12}$ and R$^{13}$ are independently chosen from the group consisting of hydrogen, halogens, alkyl groups with 1 to 20, preferably 1 to 10 and especially preferably 1 to 6 carbon atoms, cycloalkyl groups with 3 to 8 carbon atoms, R$^{8*}_3$Si, C(=Y*)R$^{5*}$, C(=Y*)NR$^{6*}$R$^{7*}$, where Y*, R$^{5*}$, R$^{6*}$ and R$^{7*}$ are defined as above, COCl, OH, (preferably one of the residues R$^{11}$, R$^{12}$ and R$^{13}$ is OH), CN, alkenyl or alkynyl groups with 2 to 20 carbon atoms, preferably 2 to 6 carbon atoms and especially preferably allyl or vinyl, oxiranyl, glycidyl, alkylene or alkenylene groups with 2 to 6 carbon atoms, which are substituted with oxiranyl or glycidyl, aryl, heterocyclyl, aralkyl, aralkenyl (aryl-substituted alkenyl, where aryl is defined as above and alkenyl is vinyl, which is substituted with one or two C$_1$ to C$_6$ alkyl groups and/or halogen atoms, preferably with chlorine), alkyl groups with 1 to 6 carbon atoms, in which one up to all of the hydrogen atoms, preferably one, is/are substituted by halogen (preferably fluorine or chlorine, if one or more hydrogen atoms are replaced, and preferably fluorine, chlorine or bromine, if one hydrogen atom is replaced), alkyl groups with 1 to 6 carbon atoms, which with 1 to 3 substituents (preferably 1) are chosen from the group consisting of C$_1$–C$_4$ alkoxy, aryl, heterocyclyl, C(=Y*)R$^{5*}$, (where R$^{5*}$ is defined as above), C(=Y*)NR$^{6*}$R$^{7*}$ (where R$^{6*}$ and R$^{7*}$ are defined as above), oxiranyl and glycidyl (preferably not more than 2 of the residues R$^{11}$, R$^{12}$ and R$^{13}$ are hydrogen, especially preferably a maximum of one of the resides R$^{11}$, R$^{12}$ and R$^{13}$ is hydrogen); m is 0 or 1; and m=0, 1 or 2 [sic].

Among the especially preferred initiators are benzyl halides like p-chloromethylstyrene, α-dichlorxylene, α, α-diochlorxylene, α, α-dibromxylene and hexakis(α-bromomethyl)benzene, benzyl chloride, benzyl bromide, 1-bromo-1-phenylethane and 1-chloro-1-penylethane; carboxylic acids derivatives that are halogenated in a position such as propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides like tetrachloromethane, tribromomethane, 1-vinylethyl chloride, 1-vinylethyl bromide; and halogen derivatives of phosphoric acid esters like dimethylphosphoric chloride.

The initiator is in general used in a concentration in the range of $10^{-4}$ mol/L to 3 mol/L, preferably in the range of $10^{-3}$ mol/L to $10^{-1}$ mol/L and especially preferably in the range of $5 \times 10^{-2}$ mol/L to $5 \times 10^{-1}$ mol/L, without any limitation intended by this. The molecular weight of the polymer results from the ratio of initiator to monomer, if all of the monomer is converted. Preferably this ratio lies in the range of $10^{-4}$ to 1 up to 0.5 to 1, especially preferably in the range of $1 \times 10^{-3}$ to 1 up to $5 \times 10^{-2}$ to 1.

Catalysts that contain at least one transition metal are used to conduct the polymerization. Here any transition metal compound that can produce a redox cycle with the initiator or the polymer chain that has a transferable atomic group can be used. In these cycles the transferable atomic group and the catalyst reversibly form a compound, with the degree of oxidation of the transition metal being increased or decreased. Here one assumes that radicals are released or trapped, so that the concentration of radicals stays very low. However, it is also possible that the insertion of ethylenically unsaturated monomers into the Y—X or $Y(M)_z$—X bond will be enabled or facilitated by the addition of the transition metal compound to the transferable atomic group, where Y and X have the meaning given above and M means the monomer, while z represents the degree of polymerization.

Preferred transition metals here are Cu, Fe, Co, Cr, Ne, Sm, Mn, Mo, Ag, Zn, Pd, Pt, Re, Rh, Ir, In, Yd, and/or Ru, which are used in appropriate degrees of oxidation. These metals can be used individually and as mixtures. It is assumed that these metals catalyze the redox cycles of the polymerization, with the redox pairs $Cu^+/Cu^{2+}$ or $Fe^{2+}/Fe^{3+}$, for example, being active. Accordingly, the metal compounds are added to the reaction mixture as halides such as chloride or bromide, as alkoxide, hydroxide, oxide, sulfate, phosphate or hexafluorophosphate or trifluoromethane sulfate. Among the preferred metallic compounds are $Cu_2O$, CuBr, CuCl, CuI, $CuN_3$, CuSCN, CuCN, $CuNO_2$, $CuNO_3$, $CuBF_4$, $Cu(CH_3COO)$ $Cu(CF_3COO)$, $FeBr_2$, $RuBr_2$, $CrCl_2$ and $NiBr_2$.

However, compounds in higher degrees of oxidation states can also be used, for example CuO, $CuBr_2$, $CuCl_2$, $CrCl_3$ and $Fe_2O_3$, $FeBr_3$. In these cases the reaction can be initiated with the aid of classical radical formers such as AIBN. Here the transition metal compounds are reduced at first, since they are reacted with the radicals generated from the classical radical formers. This is the reverse ATRP, as was described by Wang and Matyjaszewski in Macromolecules (1995) Vol. 28, pp. 7572–7573.

Moreover, the transition metals can be used for catalysis as metal in the zero oxidation state, especially in mixture with the previously mentioned compounds, as is indicated, for example, in WO 98/40415. In these cases the reaction rate of the conversion can be increased. One assumes that in this way the concentration of catalytically active transition metal compound is increased by comproportionating transition metals in a high oxidation state with metallic transition metal.

The molar ratio of transition metal to initiator lies in general in the range of 0.0001:1 to 10:1, preferably in the range of 0.001:1 to 5:1 and especially preferably in the range of 0.01:1 to 2:1, without this intending to imply any limitation.

The polymerization takes place in the presence of ligands that can form a coordination compound with the metallic catalyst(s). These ligands serve, among other things, to increase the solubility of the transition metal compound. Another important function of the ligands is that the formation of stable organometallic compounds is avoided. It is particularly important, since these stable compounds would not polymerize under the selected reaction conditions. In addition, it is assumed that the ligands facilitate the abstraction of the transferable atomic group.

These ligands are substantially known and are described, for example, in WO 97/18247 and WO 98/40415. These compounds in general have one or more nitrogen, oxygen, phosphorus and/or sulfur atoms, via which the metal atom can be bonded. Many of these ligands can in general be represented by the formula $R^{16}$—Z—$(R^{18}$—Z$)_m$—$R^{17}$, where $R^{16}$ and $R^{17}$ independently mean H, $C_1$ to $C_{20}$ alkyl, aryl, heterocyclyl, which can optionally be substituted. These substituents include, among others, alkoxy residues and the alkylamino residues. $R^{16}$ and $R^{17}$ can optionally form a saturated, unsaturated or heterocyclic ring. Z means O, S, NH, $NR^{19}$, or $PR^{19}$, where $R^{19}$ has the same meaning as $R^{16}$. $R^{18}$ means, independently, a divalent group with 1 to 40 C atoms, preferably 2 to 4 C atoms, which can be linear, branched or cyclic, such as a methylene, ethylene, propane or butylene group. The meaning of alkyl and aryl was given above. Heterocyclyl residues are cyclic residues with 4 to 12 carbon atoms, in which one or more of the $CH_2$ groups of the ring has been replaced by heteroatom groups like O, S, NH and/or NR, where the residue R has the same meaning as $R^{16}$.

Another group of suitable ligands can be represented by the formula

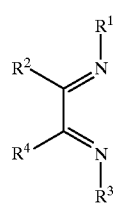

(VI)

where $R^1$, $R^2$, $R^3$ and $R^4$ independently mean H, $C_1$–$C_{20}$ alkyl, aryl, heterocyclyl and/or heteroaryl residues, where the residues $R^1$ and $R^2$ or $R^3$ and $R^4$ together can form a saturated or unsaturated ring.

Preferred ligands here are chelate ligands that contain N atoms.

Among the preferred ligands are triphenylphosphane, 2,2-bipyridine, alkyl-2,2-bipyridine like 4,4-di-(5-nonyl)-2, 2-bipyridine, 4,4-di-(5-heptyl)-2,2 bipyridine, tris(2-aminoethyl)amine (TREN), N,N,N',N',N"-pentamethyldiethylenetriamine, 1,1,4,7,10,10-hexamethyltriethylenetetraamine and/or tetramethylethylenediamine. Other preferred ligands are described, for example, in WO 97/47661. The ligands can be used individually or as a mixture.

These ligands can form coordination compounds in situ with the metal compounds or they can be prepared initially as coordination compounds and then added to the reaction mixture.

The ratio of ligand to transition metal is dependent upon the dentation of the ligand and the coordination number of the transition metal. In general the molar ratio is in the range of 100:1 to 0.1:1, preferably 6:1 to 0.1:1 and especially preferably 3:1 to 0.5:1, without this intending to imply any limitation.

The monomers, the transition metal catalysts, the ligands and the initiators are chosen in each case according to the desired polymer solution. It is assumed that a high rate constant for the reaction between the transition metal-ligand complex and the transferable atomic group is important for a narrow molecular weight distribution. If the rate constant of this reaction is too low, the concentration of radicals will be too high, so that the typical termination reactions that are responsible for a broad molecular weight distribution will occur. The exchange rate is, for example, dependent on the transferable atomic group, the transition metal, the ligands and the anion of the transition metal compound. The specialist will find valuable advice for choosing these components in WO 98/40415, for example.

As a partial step of the preparation method, the polymerization can be carried out with or without solvents. It is characteristic for the method that the catalyst is separated, by filtering, from a liquid composition that exhibits a solvent with a dielectric constant $\leq 4$, preferably $\leq 3$ and very especially preferably $\leq 2.5$. This value is determined at 20° C., and a specialist will find valuable advice regarding the measurement in Ullmann's Encyclopedia of Industrial Chemistry, 1966, Vol. II/2, pp. 455 to 479.

Accordingly, an appropriate solvent can be added before filtration, or after polymerization, or the polymerization can take place in the presence of a solvent whose dielectric constant is $\leq 4$. The term solvent here is to be understood broadly. Unreacted monomers that remain in the composition after the polymerization can, for example, also serve as solvents.

Preferably the polymerization is carried out in a nonpolar solvent. Among these solvents are hydrocarbon solvents such as aromatic solvents like toluene, benzene and xylene, and saturated hydrocarbons such as cyclohexane, heptane, octane, nonane, decane, dodecane, which can also occur in branched form. These solvents can be used individually and as a mixture. Especially preferred solvents are mineral oils and synthetic oils and mixtures of these. Of these, mineral oils are really especially preferred.

Mineral oils are substantially known and commercially available. They are in general obtained from petroleum or crude oil by distillation and/or refining and optionally additional purification and processing methods, especially the higher-boiling fractions of crude oil or petroleum fall under the concept of mineral oil. In general, the boiling point of the mineral oil is higher than 200° C., preferably higher than 300° C., at 5000 Pa. Preparation by low temperature distillation of shale oil, coking of hard coal, distillation of lignite under exclusion of air as well as hydrogenation of hard coal or lignite is likewise possible. To a small extent mineral oils are also produced from raw materials of plant origin (for example, jojoba or rapeseed oil) or animal origin (for example, neatsfoot oil). Accordingly, mineral oils exhibit different amounts of aromatic, cyclic, branched and linear hydrocarbons, in each case according to origin.

In general, one distinguishes paraffin-base naphthenic and aromatic fractions in crude oil or mineral oil, where the term paraffin-base fraction stands for longer-chain or highly branched isoalkanes and naphthenic fraction stands for cycloalkanes. Moreover, mineral oils, in each case according to origin and processing, exhibit different fractions of n-alkanes, isoalkanes with a low degree of branching, so called monomethyl-branched paraffins, and compounds with heteroatoms, especially O, N and/or S, to which polar properties are attributed. The fraction of n-alkanes in the preferred mineral oils is less than 3% by weight, the fraction of O, N and/or S-containing compounds is less than 6% by weight. The fraction of aromatic compounds and monomethyl-branched paraffins is in general in each case in the range of 0 to 30% by weight. In accordance with one interesting aspect, mineral oil comprises mainly naphthenic and paraffin-base alkanes, which in general have more than 13, preferably more than 18 and very especially preferably more than 20 carbon atoms. The fraction of these compounds is in general $\geq 60\%$ by weight, preferably $\geq 80\%$ by weight, without any limitation intended by this.

An analysis of especially preferred mineral oils, which was done with traditional methods such as urea dewaxing and liquid chromatography on silica gel, shows, for example, the following components, where the percentages refer to the total weight of the relevant mineral oil:

n-alkanes with about 18 to 31 C atoms:
 0.7–1.0%,
low-branched alkanes with 18 to 31 C atoms:
 1.0–8.0%,
aromatic compounds with 14 to 32 C atoms:
 0.4–10.7%,
iso- and cycloalkanes with 20 to 32 C atoms:
 60.7–82.4%,
polar compounds:
 0.1–0.8%,
loss:
 6.9–19.4%.

Valuable advice regarding the analysis of mineral oil as well as a list of mineral oils that have other compositions can be found, for example, in Ullman's Encyclopedia of Industrial Chemistry, 5$^{th}$ Edition on CD-ROM, 1997, under the entry "lubricants and related products."

Synthetic oils are, among other substances, organic esters, organic ethers like silicone oils and synthetic hydrocarbons, especially polyolefins. They are for the most part somewhat more expensive than the mineral oils, but they have advantages with regard to performance. For an explanation one should refer to the 5 API classes of base oil types (API: American Petroleum Institute), and these base oils can especially preferably be used as solvents.

These solvents are used before or during the filtration, preferably in an amount of 1 to 99% by weight, especially preferably 5 to 95% by weight and really especially preferably 10 to 60% by weight, with respect to the total weight of the mixture. The composition can also have solvents with a higher dielectric constant during the filtration, but the amount of these solvents is limited by the fact that they must not have any unacceptably disadvantageous effect on the separation of the catalyst. The ratio of polar solvent (dielectric constant >4) to a polar solvent (dielectric constant $\leq 4$) is in general less and 1:1, preferably 1:2 and especially preferably 1:3, without any limitation intended by this. However, the difference of the dielectric constant should be taken into account here.

The polymerization can be carried out at normal pressure, reduced pressure or elevated pressure. The polymerization temperature is also not critical. However, in general it lies in the range of −20–200° C., preferably 0–130° C. and especially preferably 60–120° C., without limitation intended by this.

Polymers with predetermined architecture can be obtained in a simple way with the aid of this method. These possibilities result from the "living" nature of the polymerization method. These structures include, among others, block copolymers, gradient copolymers, star copolymers, highly branched polymers, polymers with reactive end groups and graft copolymers. The polymers made in this way in general have a molecular weight in the range of 1,000 to 1,000,000 g/mol, preferably in the range of $10\times10^3$ to $500\times10^3$ g/mol and especially preferably in the range of $20\times10^3$ to $300\times10^3$ g/mol, without any limitation being intended by this. These values refer to the weight average molecular weight of the polydisperse polymers in the composition.

The particular advantage of ATRP compared to the traditional radical polymerization methods lies in the fact that polymers with narrow molecular weight distribution can be made. Without intending any limitation by this, polymers that were produced by the method in accordance with the invention exhibit a polydispersity, given by $M_w/M_n$, in the range of 1 to 12, preferably 1 to 4.5, especially preferably 1 to 3, and very especially preferably 1.05 to 2.

After the polymerization the oxidation state of the transition metal is increased. Through the oxidation of the transition metal the solubility of the catalyst decreases, in each case according to the choice of the ligand(s), so that the transition metal can be separated by filtration if a solvent whose dielectric constant is $\leq 4$ is present.

The oxidation of the transition metal can be carried out with well known oxidation agents such as oxygen, $H_2O_2$ or ozone. Preferably the catalyst is oxidized with atmospheric oxygen. Complete oxidation of the transition metal or transition metal compound is not necessary. In many cases contact between the composition and atmospheric air for a few minutes is sufficient to guarantee sufficient precipitation of the transition metal compound.

The filtration is substantially known and is described, for example, in Ullmann's Encyclopedia of Industrial Chemistry, Fifth Edition, under the entry "filtration." Within the scope of this invention filtration is understood to mean the separation of solid particles from a liquid with the aid of a porous layer (filter agent) that is permeable to the liquid, while the solids are held back. It is assumed that the separation takes place because of the size differences.

The filter agent consists, among other things, of loose or consolidated solid layers such as beds of sand, coke, diatomaceous earth, plastic; porous stones of quartz, fireclay, carbon, plastics; filter membranes of cellulose derivatives, plastics, woven or nonwoven fabrics of metal fibers, natural fibers, synthetic fibers and glass fibers; sintered material of metal powders, porcelain glass powders, etc.

To improve the results of filtration, one can use substantially known filter aids such as flocculation agents, which affect the filtering ability of particles via their zeta potential.

The well known filtration methods include, among others, screening, especially with membranes and microfilters, cake filtration in which a filter cake is formed, and deep bed filtration, in which the solid is deposited in the filter. The filtration can be carried out batchwise or continuously, with a continuous filtration in general making a cleaning of the filter necessary during the filtration, such as occurs, for example, in a cross flow filtration.

The type of filter element is not critical. The specialist will choose an appropriate one based on his knowledge. The well known filter elements include sack filters, belt filters, cartridge filters, disk filters, filter presses, drum filters, leaf filters and pipe filters.

An important element of the filtration is a pressure differential, which conducts the liquid through the filter medium. This pressure differential can be generated in any of the ways known in industry. Among these are pumps, which can produce both an overpressure and an underpressure. In addition, the liquid can also be forced directly through the filter. In each case according to viscosity a height difference can be sufficient for the composition to flow through the filter.

Devices for conducting the filtration are widely known and commercially available.

Preferably the composition is purified at a pressure difference in the range of 0.1 to 50 bar, preferably 1 to 10 bar and especially preferably 1.5 to 2.5 bar with a filter having a sieve size of 0.01 $\mu$m to 1 mm, preferably 1 $\mu$m to 100 $\mu$m and especially preferably 5 $\mu$m to 100 $\mu$m. This information is intended as a starting point, since the purification is also dependent on the viscosity of the solvent and the particle size of the precipitate.

The filtration takes place in a temperature range similar to that of the polymerization, where the upper range is dependent on the stability of the polymer. The lower limit is governed by the viscosity of the solution.

The liquid polymer composition prepared in this way at room temperature or higher temperatures can be used without additional purification, for example as an additive in lubricants. In addition, the polymer can be isolated from the composition. For this the solvent or remaining monomers can be separated by distillation. Moreover, the polymers can be separated from the composition by precipitation.

The invention is illustrated in more detail below by examples and comparison examples, without the invention intended to be limited to these examples.

EXAMPLES 1 to 4 AND COMPARISON EXAMPLE 1

All of the polymerizations were carried out in accordance with the following general procedure.

The ATRP polymerization tests were carried out in a four-neck round-bottom flask, which was provided with a saber stirrer, a heating mantle, a nitrogen inlet and a rapid cooling system. The monomer mixture and the relevant solvent were put into the flask in the amounts given in Table 1 and inertized by the addition of dry ice and the input of nitrogen. Then the corresponding amount of catalyst, CuBr or CuCl, and ligand (pentamethyldiethylenetriamine (PMDETA)) was added.

After heating to 90° C. the corresponding amount of initiator (ethyl 2-bromoisobutyrate (EBiB) or para-toluenesulfonyl chloride (pTSCl)). The temperature in the reaction flask was raised to 100° C. After a reaction time of about 20 hours the mixture was cooled to room temperature. Then the reaction mixture was filtered in order to separate the transition metal catalyst. A Seitz filter press with heatable metal jacket (Type EF 14/2, year of manufacture 1990) and a Seitz deep bed filter, of the type listed in Table 2 in each case, was used. The filtration took place at 100° C. and at an overpressure of 2 bar. The resulting filtrate was analyzed by GPC and AAS in order to characterize the resulting polymer and the concentration of transition metal.

The amounts of the components that were used in each case are given in Table 1. In Table 1 SM 920 designates a mineral oil obtained from Shell AG, G 07 is a naphthene-based mineral oil, which is likewise obtained from Shell AG. PAO 2 designates a synthetic oil based on poly(alpha-olefins) from Chevron Co. The mixtures of the solvents in accordance with the invention (SM 920 and G 07/PAO 2) have dielectric constants of 2.1 and 2.2, respectively. MMA means methyl methacrylate. DPMA was obtained by the reaction of ®Dobanol 25L (Shell AG) with methyl methacrylate. SMA was obtained by the reaction of ®Dehydad (Henkel KGaA) with methyl methacrylate. In these reactions the methanol that was produced was separated. DMAPMA designates N,N-dimethylaminopropyl methacrylate. The monomer mixture had a dielectric constant of 3.0. The butyl acetate used in the comparison example has a dielectric constant of 4.5.

The results are summarized in Table 2 as the number average molecular weight $M_n$ and polydispersity PDI ($M_w/M_n$) of the resulting polymers and the Cu content of the filtrate.

TABLE 1

|  | Katalysator[1] [g] | Ligand [g] | Monomer-mischung[2] [g] | Initiator[3] [g] | Lösungsmittel[4] [g] |
|---|---|---|---|---|---|
| Bsp. 1[5] | 0.87 CuBr | 0.78 PMDETA | 360:40 DPMA:MMA | 0.72 EBiB | 400 SM920 |
| Bsp. 2[5] | 0.09 CuBr | 0.11 PMDETA | 115:32.5:22 DPMA:SMA:MMA | 0.09 EBiB | 235 SM920 |
| Bsp. 3[5] | 0.19 CuCl | 0.32 PMDETA | 190:22:7.7 DPMA:MMA:DMAPMA | 0.28 pTSCl | 90:90 G07:PAO 2 |
| Bsp. 4[5] | 0.95 CuCl | 1.61 PMDETA | 540:60 DPMA:MMA | 2.95 pTSCl | 222 SM920 |
| Verqi. 1[6] | 0.43 CuCl | 0.72 PMDETA | 225:25 DPMA:MMA | 0.80 pTSCl | 107 Butyl acetat[7] |

Key:
[1]Catalyst
[2]Monomer mixture
[3]Initiator
[4]Solvent
[5]Example
[6]Comparison example
[7]Butyl acetate

TABLE 2

| Polymer solution | Mn [g/mol] | PDI | Filter Type | Cu content (ppm) |
|---|---|---|---|---|
| Example 1 | 86 000 | 1.22 | K 250 | 1 |
| Example 1 | 86 000 | 1.22 | K 800 | 2 |
| Example 2 | 280 000 | 2.10 | K 300 | 2 |
| Example 3 | 150 000 | 1.27 | K 800 | 1 |
| Example 4 | 40 000 | 1.20 | T 1000 | 2 |
| Example 4 | 40 000 | 1.20 | K 800 | 2 |
| Comparison Example 1 | 60 000 | 1.20 | K 800 | 50 |

What is claimed is:

1. A method for preparation of a liquid polymer composition, in which ethylenically unsaturated monomers are polymerized by means of initiators that have a transferable atomic group, and one or more catalysts that contain a transition metal catalyst in the presence of ligands that can form a coordination compound with the metallic catalyst(s), characterized by the fact that the transition metal of the catalyst is oxidized after the polymerization and then the catalyst is separated by filtration, where the composition has a solvent with a dielectric constant $\leq 4$.

2. A method as in claim 1, characterized by the fact that the filtration is carried out in the presence of a solvent whose dielectric constant is $\leq 3$.

3. A method as in claim 1 or 2, characterized by the fact that the solvent is used in an amount in the range of 1 to 99% by weight, with respect to the total weight of the liquid composition.

4. A method as in claim 3, characterized by the fact that the solvent is used in an amount of 5 to 95% by weight, with respect to the total weight of the liquid composition.

5. A method as in claim 4, characterized by the fact that the solvent is used in an amount in the range of 10 to 60% by weight, with respect to the total weight of the liquid composition.

6. A method as in claim 1, characterized by the fact that a mineral oil and/or synthetic oil is used as solvent.

7. A method as in claim 1, characterized by the fact that the catalyst is oxidized with atmospheric oxygen.

8. A method as in claim 1, characterized by the fact that the monometers that are used in the amount of at least 60% by weight with respect to the total weight of ethylenically unsaturated monomers are selected form the group consisting of methacrylates, fumarates and maleates.

9. A method as in claim 8, characterized by the fact that a monomer composition having
a) 60 to 100% by weight of one or more (meth)acrylates of formula (I)

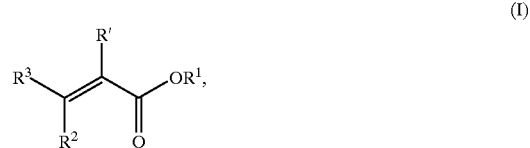

(I)

where R means hydrogen or methyl, $R^1$ means a linear or branched alkyl residue with 6 to 40 carbon atoms, $R^2$ and $R^3$ independently means hydrogen or a group of the formula —COOR', where R' is hydrogen or a linear or branched alkyl residue with 6 to 40 carbon atoms,
b) 0 to 40% by weight of one or more (meth)acrylates of the formula (II)

(II)

where R means hydrogen or methyl and $R^4$ means a linear or branched alkyl residue with 1 to 5 carbon atoms, c) 0 to 40% by weight of one or more (meth)acrylates of formula (III)

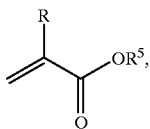

(III)

where R means hydrogen or methyl and $R^5$ means an alkyl residue with 2 to 20 substituted by an OH group, or an alkoxylated residue of formula (IV)

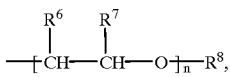

(IV)

where $R^6$ and $R^7$ independently stand for hydrogen or methyl, $R^8$ means hydrogen or an alkyl residue with 1 to 40 carbon atoms and n is a whole number from 1 to 60, d) 0 to 40% by weight of one or more (meth)acrylates of formula (V)

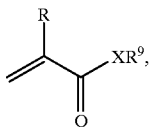

(V)

where R means hydrogen or methyl, X means oxygen or an amino group of the formula —NH— or —$NR^{10}$—, where $R^{10}$ stands for an alkyl residue with 1 to 40 carbon atoms and $R^9$ means a linear or branched alkyl residue with 2 to 20, preferably 2 to 6 carbon atoms that is substituted with at least one —$NR^{11}R^{12}$— group, where $R^{11}$ and $R^{12}$ independently stand for hydrogen, an alkyl residue with 1 to 20, carbon atoms where $R^{11}$ and $R^{12}$ together with the nitrogen atom and optionally another nitrogen or oxygen atom form a 5 or 6 member ring, which can optionally be substituted with $C_1$–$C_6$ alkyl, and e) 0 to 40% by weight of one or more comonomers, where the statement of % by weight in each case refers to the total weight of the ethylenically unsaturated monomers is polymerized.

10. A method as in claim 1, characterized by the fact that catalyst is selected from the group consisting of $Cu_2O$, CuBr, CuCl, CuI, $CuN_3$, CuSCN, $CuNO_2$, $CuBF_4$, $Cu(CH_3COO)$ and $Cu(CF_3COO)$.

11. A method as in claim 1, characterized by the fact that at least one chelate ligand that contains N atoms is used.

12. A method as in claim 1, characterized by the fact that initiator contains an element selected from Cl, Br or I or a compound selected form the group of SCN and $N_3$.

13. A method for preparation of polymers, characterized by the fact that the polymer is isolated from a polymer solution that was obtained in accordance with the method of claim 1.

14. A method of modifying a lubricant comprising adding to a lubricant a polymer prepared according to method of claim 1.

15. The method of claim 9, where $R_1$ means a linear or branched alkyl residue with 6 to 24 carbon atoms.

16. The method of claim 9, wherein $R^{11}$ and $R^{12}$ independently stand for an alkyl residue with 1 to 6 carbon atoms.

* * * * *